(12) United States Patent
Inaba

(10) Patent No.: US 12,706,239 B2
(45) Date of Patent: Aug. 11, 2026

(54) REACTOR, CONVERTER, AND POWER CONVERSION DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Kazuhiro Inaba, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 924 days.

(21) Appl. No.: 17/838,418

(22) Filed: Jun. 13, 2022

(65) Prior Publication Data

US 2022/0415561 A1 Dec. 29, 2022

(30) Foreign Application Priority Data

Jun. 23, 2021 (JP) ................................ 2021-103804

(51) Int. Cl.
*H01F 27/28* (2006.01)
*H01F 27/23* (2006.01)
(Continued)

(52) U.S. Cl.
CPC ......... *H01F 27/2823* (2013.01); *H01F 27/23* (2013.01); *H01F 27/24* (2013.01); *H02M 7/537* (2013.01)

(58) Field of Classification Search
CPC ...... H01F 3/10; H01F 27/022; H01F 27/2847; H01F 37/00; H01F 27/324; H01F 27/28; H01F 27/306
See application file for complete search history.

(56) References Cited

U.S. PATENT DOCUMENTS 6,433,664 B1 * 8/2002 Ishii ...................... H01F 27/323 336/185
6,954,131 B2 * 10/2005 DuVal ..................... H01F 37/00 336/212
(Continued)

FOREIGN PATENT DOCUMENTS

JP 08-124760 * 5/1996
JP 2013-138266 * 7/2013
JP 2018-198301 * 12/2018

*Primary Examiner* — Mang Tin Bik Lian
(74) *Attorney, Agent, or Firm* — Venjuris, P.C.

(57) ABSTRACT

Provided is a reactor that can prevent a short circuit from occurring between turns of a coil even if a foreign object is present between turns. The reactor includes: an edgewise coil formed by a flat rectangular wire; a magnetic core; and a molded resin part that covers at least a portion of the magnetic core, wherein the edgewise coil includes a plurality of turns configured to form a rectangular shape, each of the plurality of turns includes four straight portions, and four curved corner portions that connect the adjacent straight portions to each other, each of the four corner portions includes an outer region in which a gap is provided between the adjacent turns, and the molded resin part is present in at least two of the gaps that are diagonally opposite to each other.

10 Claims, 7 Drawing Sheets

(51) Int. Cl.
*H01F 27/24* (2006.01)
*H02M 7/537* (2006.01)

(56) References Cited

U.S. PATENT DOCUMENTS

| | | | | |
|---|---|---|---|---|
| 2010/0141373 | A1* | 6/2010 | Murakami | H01F 41/077 336/223 |
| 2018/0040407 | A1* | 2/2018 | Yamamoto | H01F 3/14 |
| 2018/0162119 | A1* | 6/2018 | Cruz Lemus | B41F 35/02 |
| 2020/0098502 | A1* | 3/2020 | Serizawa | H01F 41/122 |
| 2020/0118727 | A1* | 4/2020 | Inaba | H01F 27/2823 |
| 2020/0143974 | A1* | 5/2020 | Inaba | H01F 27/263 |
| 2021/0304948 | A1 | 9/2021 | Yoshikawa et al. | |

* cited by examiner

REACTOR, CONVERTER, AND POWER CONVERSION DEVICE

CROSS-REFERENCE TO RELATED APPLICATIONS

This application is based on and claims priority from Japanese Patent Application No. 2021-103804, filed on Jun. 23, 2021, with the Japan Patent Office, the disclosure of which is incorporated herein in its entirety by reference.

TECHNICAL FIELD

The present disclosure relates to a reactor, a converter, and a power conversion device.

BACKGROUND

Japanese Patent Laid-open Publication No. 2020-027835 discloses a reactor including a coil, a magnetic core, and a resin molded part. The magnetic core includes an inner core part and an outer core part. The resin molded part covers at least a portion of the surface of the magnetic core, and integrally holds the inner core part and the outer core part. The resin molded part is formed by molding the outer circumference of an assembly of the coil and the magnetic core using an unsolidified resin. Hereinafter, the resin molded part is referred to as a "molded resin part".

SUMMARY

When forming the molded resin part, a foreign object may enter a gap between turns of the coil. The foreign object may be, for example, a fragment resulting from a portion of the magnetic core being chipped under pressure applied during injection molding when forming the molded resin part through injection molding. When a foreign object is present between turns of the coil, vibration due to an external force or excitation of the coil may cause the foreign object to slide between the turns when the reactor is in use. If such sliding damages the insulating coating of the coil, a short circuit may occur between the turns.

An object of the present disclosure is to provide a reactor that can prevent a short circuit from occurring between turns of a coil even if a foreign object is present between turns. Another object of the present disclosure is to provide a converter including the aforementioned reactor. Still another object of the present disclosure is to provide a power conversion device including the aforementioned converter.

A reactor according to the present disclosure includes:

an edgewise coil formed by a flat rectangular wire;

a magnetic core; and a molded resin part that covers at least a portion of the magnetic core, wherein the edgewise coil includes a plurality of turns configured to form a rectangular shape, each of the plurality of turns includes four straight portions, and four curved corner portions that connect the adjacent straight portions to each other, each of the four corner portions includes an outer region in which a gap is provided between the adjacent turns, and the molded resin part is present in at least two of the gaps that are diagonally opposite to each other.

A converter according to the present disclosure includes the reactor according to the present disclosure.

A power conversion device according to the present disclosure includes the converter according to the present disclosure.

The reactor according to the present disclosure can prevent a short circuit from occurring between turns of a coil even if a foreign object is present between turns. The converter according to the present disclosure and the power conversion device according to the present disclosure can prevent a short circuit from occurring between turns of a coil even if a foreign object is present between turns.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS S

DETAILED DESCRIPTION

Figure 1:
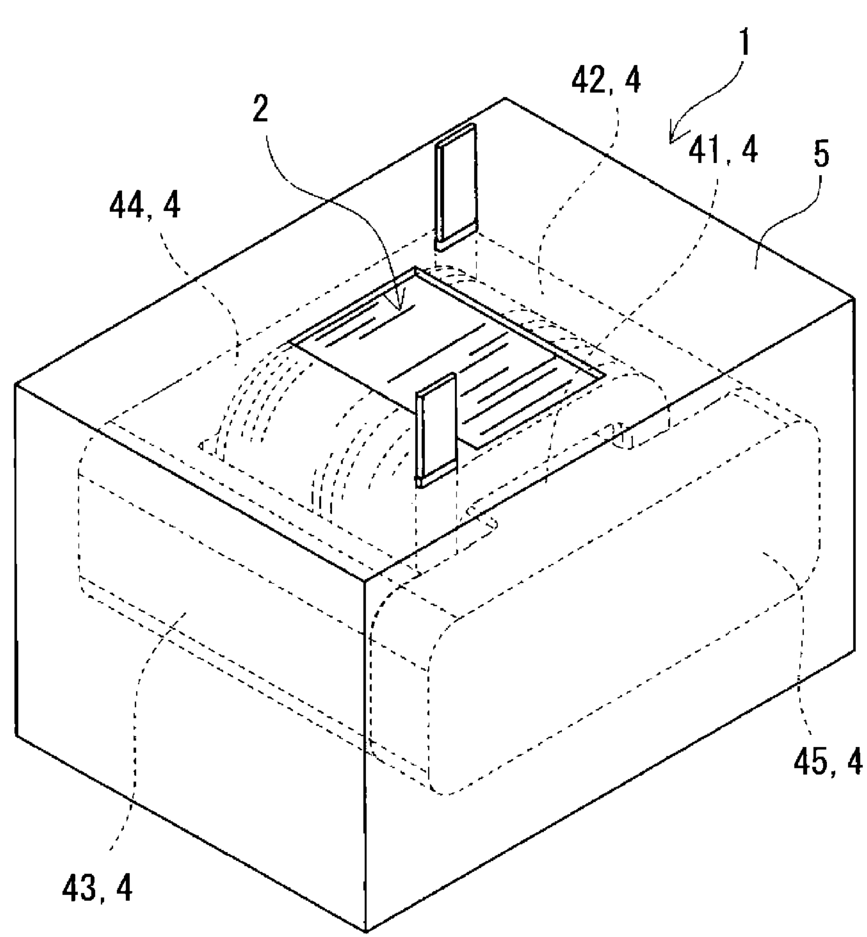
FIG. 1 is a perspective view showing an outline of a reactor according to an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of the Present Disclosure

First, aspects of the present disclosure will be listed and described.

(1) A reactor according to an embodiment of the present disclosure includes:

an edgewise coil formed by a flat rectangular wire;

a magnetic core; and a molded resin part that covers at least a portion of the magnetic core, wherein the edgewise coil includes a plurality of turns configured to form a rectangular shape, each of the plurality of turns includes four straight portions, and four curved corner portions that connect the adjacent straight portions to each other, each of the four corner portions includes an outer region in which a gap is provided between the adjacent turns, and the molded resin part is present in at least two of the gaps that are diagonally opposite to each other.

Since the molded resin part is present in the gaps in the outer regions of at least diagonally opposite corner portions of the four corner portions, the reactor according to the present disclosure can suppress displacement between the turns of the coil. Since the displacement between the turns of the coil can be suppressed, it is possible to prevent a short circuit from occurring between the turns of the coil even if a foreign object is present between the turns.

(2) In an embodiment of the above-described reactor, each of the four corner portions may include an inner region in which an interval between the adjacent turns is smaller than an interval between the gaps.

In other words, in the above-described embodiment, the outer regions of the four corner portions are provided with gaps that are wider than the gaps in the inner regions. Accordingly, the molded resin part is likely to enter the gaps in the outer regions.

(3) In an embodiment of the above-described reactor, an aspect ratio a/b that is a ratio between a length a of a long side and a length b of a short side of the flat rectangular wire in a cross section thereof may be 2 or more.

In the above-described embodiment, gaps are likely to be formed in the outer regions of the four corner portions.

(4) In an embodiment of the above-described reactor, each of the four corner portions may have a bending radius of 10 mm or less.

In the above-described embodiment, gaps are likely to be formed in the outer regions of the four corner portions.

(5) In an embodiment of the above-described reactor, a maximum length between the adjacent outer regions may be 10 μm or more and 1000 μm or less.

In the above-described embodiment, the molded resin part is likely to enter the gaps in the four outer regions.

(6) In an embodiment of the above-described reactor, the length of a portion of the molded resin part that is present in the gaps may be 25% or more of the length of a long side of the flat rectangular wire in a cross section thereof.

In the above-described embodiment, displacement between the turns of the coil can be more easily suppressed.

(7) A converter according to embodiment of the present disclosure includes the reactor according to any one of (1) to (6) above.

The converter according to the present disclosure includes the reactor according to the present disclosure, and therefore can prevent a short circuit from occurring between the turns of the coil even if a foreign object is present between the turns.

(8) A power conversion device according to an embodiment of the present disclosure includes the converter according to (7) above.

The power conversion device according to the present disclosure includes the converter according to the present disclosure, and therefore can prevent a short circuit from occurring between the turns of the coil even if a foreign object is present between the turns.

Details of Embodiments of the Present Disclosure

Specific examples of a reactor according to embodiments of the present disclosure will be described below with reference to the drawings. It should be noted that the present invention is not limited to these examples, but is defined by the claims, and is intended to include all modifications which fall within the scope of the claims and the meaning and scope of equivalents thereof.

Outline

Figure 2:
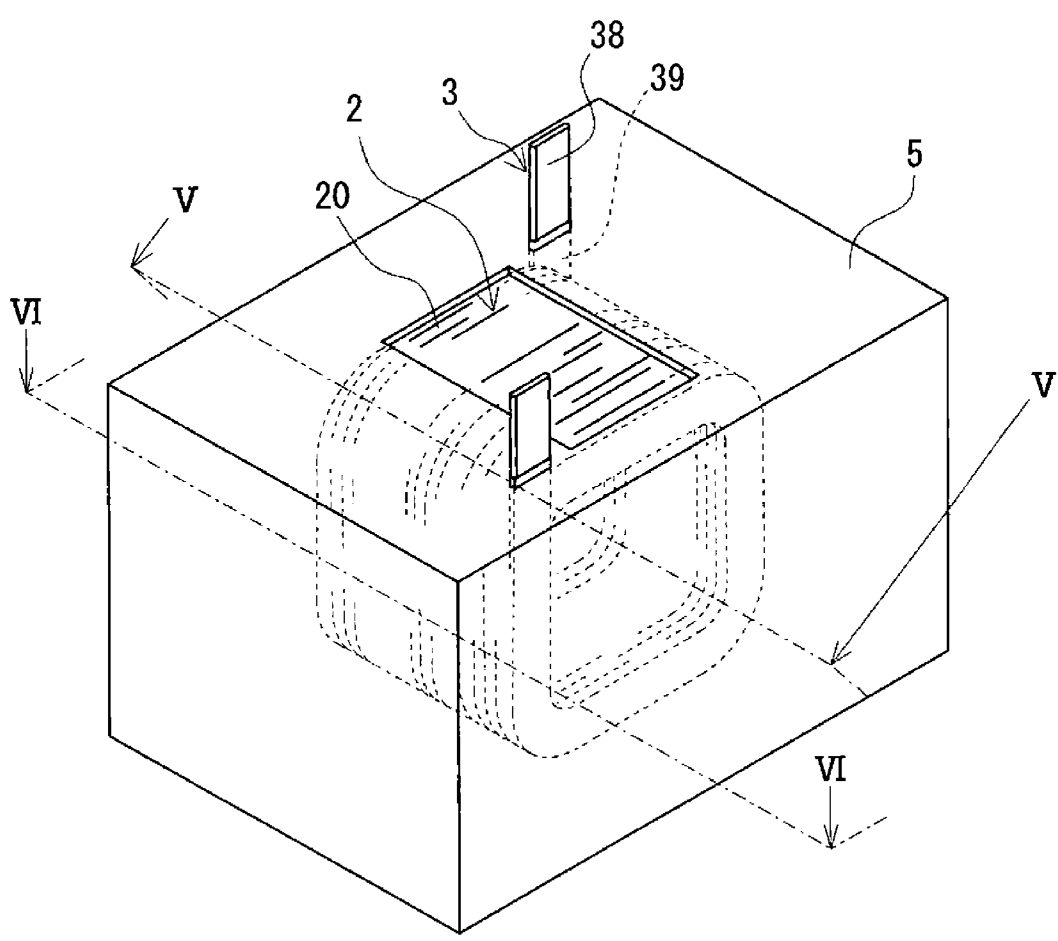
FIG. 2 is a diagram illustrating a relationship between a coil and a molded resin part of the reactor shown in FIG. 1.
Figure 5:
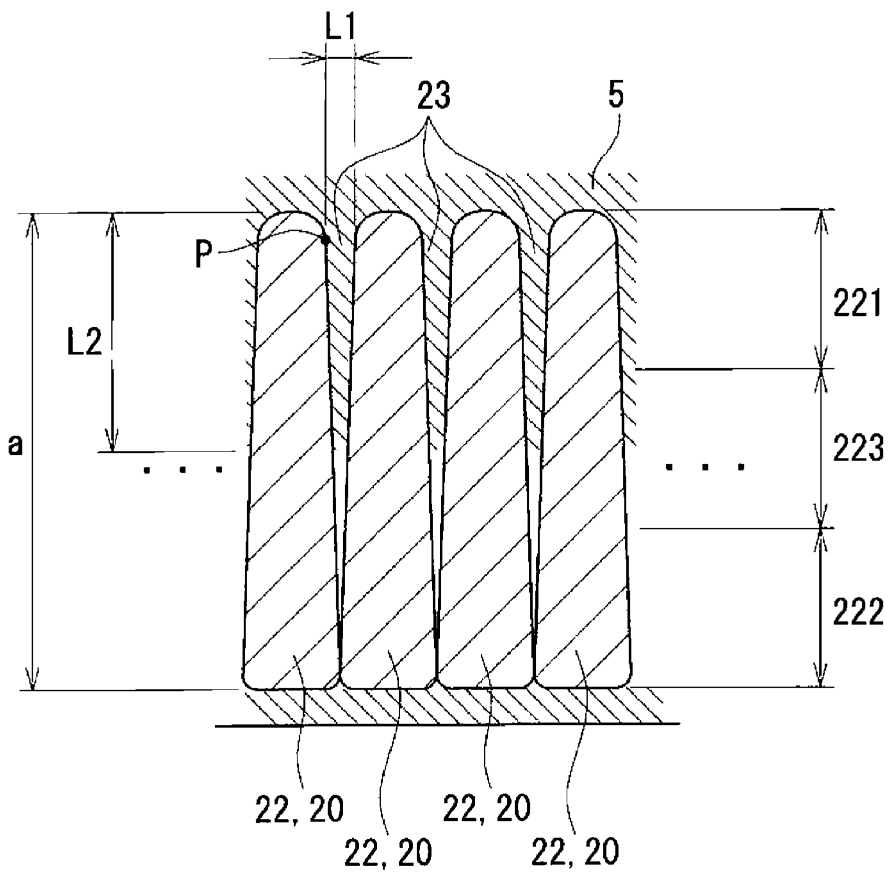
FIG. 5 is a cross-sectional view taken along the line V-V in FIG. 2.

As shown in FIG. 1, a reactor 1 according to an embodiment includes a coil 2, a magnetic core 4, and a molded resin part 5. As shown in FIG. 2, the coil 2 includes a plurality of turns 20. A feature of the reactor 1 according to the embodiment lies in that, as shown in FIG. 5, a gap 23 is provided at a specific location between adjacent turns 20, and the molded resin part 5 is present in the gaps 23. Each of these components will be described in detail below.

FIG. 1 shows an example of the reactor 1. In FIG. 1, the molded resin part 5 is depicted simplified as having a rectangular shape. In the reactor 1, a portion of the coil 2 is exposed from the molded resin part 5, and the remaining portion of the coil 2 and the magnetic core 4 are disposed inside the molded resin part 5. In FIG. 1, the portions disposed inside the molded resin part 5 are indicated by broken lines. In FIG. 2, the magnetic core 4 has been omitted from the reactor 1 shown in FIG. 1. In the drawings, portions of configurations are shown exaggerated or simplified in some cases for convenience of description. The dimensional ratios of the components in the drawings may be different from the actual ratios. In the drawings, identical reference numerals denote identical parts.

Coil

As shown in FIG. 2, the coil 2 is an edgewise coil formed by a flat rectangular wire 3. The coil 2 includes a plurality of turns 20 configured to form a rectangular shape. The coil 2 of the present example is formed by being wound edgewise such that adjacent turns 20 are in contact with each other when the coil 2 is produced. The coil 2 that has been wound edgewise such that adjacent turns 20 are in contact with each other is formed such that the adjacent turns 20 are in proximity or in contact with each other on the inner side of the coil 2. Regarding a coil 2 that has been wound edgewise such that the adjacent turns 20 are in contact with each other, the coil 2 formed by the plurality of turns 20 has a short axial length and is thus compact.

Flat Rectangular Wire

Figure 4:
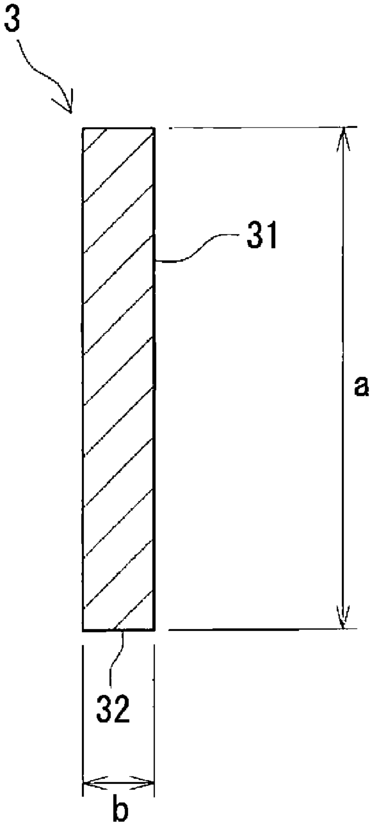
FIG. 4 is a schematic cross-sectional view showing a flat rectangular wire that forms the coil of the reactor shown in FIG. 1.

The flat rectangular wire 3 is a winding having a rectangular transverse cross section. The transverse cross section of the flat rectangular wire 3 is a cross section obtained by cutting the flat rectangular wire 3 along a plane that is orthogonal to the longitudinal direction of the flat rectangular wire 3. As shown in FIG. 4, the flat rectangular wire 3 includes a pair of long sides 31 and a pair of short sides 32 in a transverse cross section of the flat rectangular wire 3.

The aspect ratio of the flat rectangular wire 3 in a transverse cross section thereof may be 2 or more. The aspect ratio is the ratio a/b between the length a of the long side 31 and the length b of the short side 32. The aspect ratio refers to the aspect ratio of the flat rectangular wire 3 before being wound edgewise. The length a of the long side 31 of the flat rectangular wire 3 before being wound edgewise is substantially equal to the length a of the long side 31 of the flat rectangular wire 3 after being wound edgewise. The length b of the short side 32 of the flat rectangular wire 3 before being wound edgewise is substantially equal to the length b of the short side 32 on the inner side or outer side of straight portions 21 (FIG. 3) that constitute each turn 20 of the flat rectangular wire 3 after being wound edgewise. The length of the short side 32 at corner portions 22 (FIG. 3) that constitute each turn 20 of the flat rectangular wire 3 after being wound edgewise is larger on the inner side, and smaller on the outer side than the length b of the short side 32 of the flat rectangular wire 3 before being wound edgewise. The reason that the length of the short side 32 at the corner portions 22 after the flat rectangular wire 3 has been wound edgewise changes is that, at the corner portions 22, a compressive force acts on the inner side of a bend, and a tensile force acts on the outer side of the bend when the flat rectangular wire 3 is wound edgewise. At the corner portions 22, the flat rectangular wire 3 bulges in the direction of the short side 32 as a result of a compressive force acting on the inner side of the bend, and the flat rectangular wire 3 is reduced in thickness in the direction of the short side 32 as a result of a tensile force acting on the outer side of the bend.

When the above-described aspect ratio is 2 or more, the length b of the short side 32 on the outer side of the edgewise-wound flat rectangular wire 3 tends to be small at the corner portions 22, as described above. Accordingly, gaps 23 (FIG. 5) are likely to be formed in outer regions 221, which will be described below, of the corner portions 22. The above-described aspect ratio may also be 4 or more, 5 or more, and particularly 7 or more. The above-described aspect ratio may be 20 or less, and even 15 or less, in view of the flat rectangular wire 3 being wound edgewise. The above-described aspect ratio may be 2 or more and 20 or less, even 4 or more and 15 or less, 5 or more and 12 or less, and particularly 7 or more and 10 or less.

The length a of the long side 31 and the length b of the short side 32 can be selected as appropriate so as to satisfy the above-described aspect ratio. The length a of the long side 31 may be, for example, 3 mm or more and 20 mm or less, even 5 mm or more and 15 mm or less, and particularly 7 mm or more and 12 mm or less. The length b of the short side 32 may be, for example, 0.5 mm or more and 3 mm or less, even 0.7 mm or more and 2 mm or less, and particularly 0.8 mm or more and 1.5 mm or less.

As shown in FIG. 2, the flat rectangular wire 3 may be a coated wire including a conductive wire 38 and an insulating coating 39. Examples of the constituent material of the conductive wire 38 include copper. Examples of the constituent material of the insulating coating 39 include resins such as polyamide imide. The insulating coating 39 is stripped off at two end portions of the coil 2, thus exposing the conductive wire 38. A terminal (not shown) is connected to each of the exposed portions of the conductive wire 38.

Turns

Figure 3:
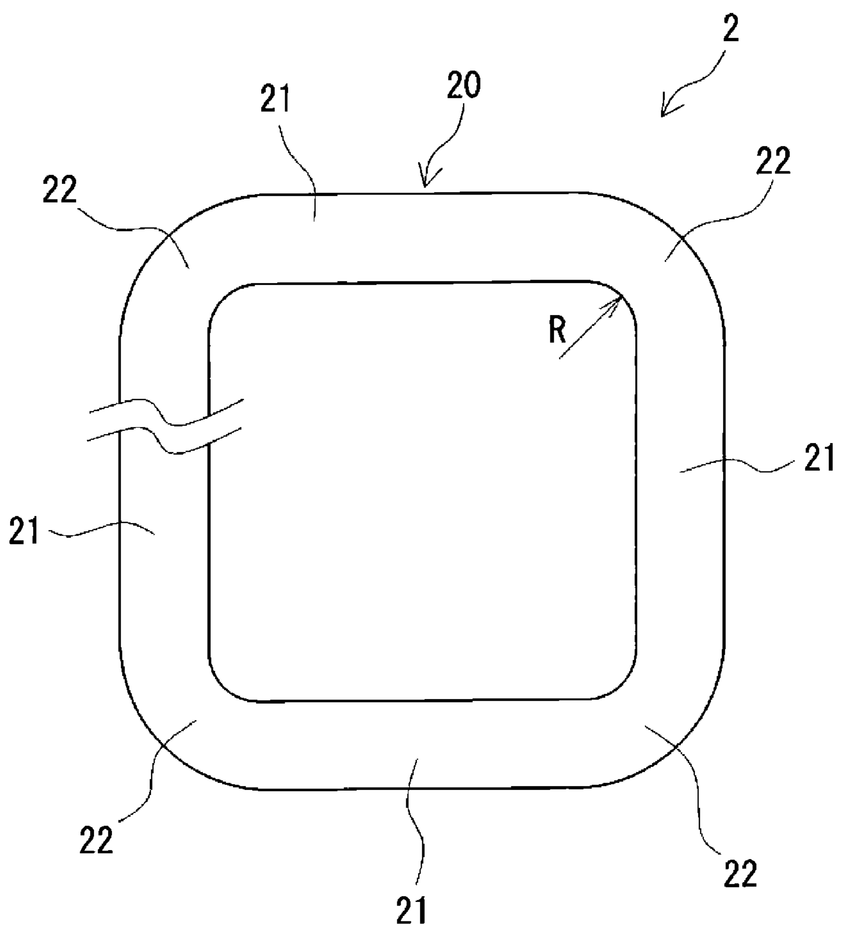
FIG. 3 is a schematic end view showing one of a plurality of turns that constitute the coil of the reactor shown in FIG. 1.

As shown in FIG. 3, each of the plurality of turns 20 includes four straight portions 21 and four corner portions 22. The turns 20 are configured to form a rectangular shape. The turns 20 are formed by winding the flat rectangular wire 3 in an edgewise manner into a spiral. Accordingly, in FIG. 3, at a location where the turn 20 transitions to the adjacent turn 20, cutting lines are shown dividing the circumferential direction of the turn 20. The turns 20 may be configured to form a rectangular shape that satisfies the condition that the bending radius R of each corner portion 22 is 10 mm or less. By making the bending radius R of each corner portion 22 10 mm or less, a gap 23 is likely to be formed in the outer region 221, which will be described below, of each corner portion 22. The bending radius R of each corner portion 22 may may also be 8 mm or less, 7 mm or less, 6 mm or less, and particularly 5 mm or less. The bending radius R of the corner portion 22 may be 1 mm or more, and even 2 mm or more, in view of the flat rectangular wire 3 being wound edgewise. The bending radius R of the corner portion 22 may be 1 mm or more and 10 mm or less, even 2 mm or more and 8 mm or less, 3 mm or more and 7 mm or less, and particularly 5 mm or more and 6 mm or less.

Corner Portions of Turn

The corner portions 22 of each turn 20 are each configured to have a curved shape that connects the adjacent straight portions 21 to each other. As shown in FIG. 5, each corner portion 22 includes an outer region 221, an inner region 222, and a central region 223 in a longitudinal cross section of the plurality of turns 20 that include the corner portions 22. The longitudinal cross section of the plurality of turns 20 is a cross section obtained by cutting the plurality of turns 20 along a plane parallel to the axial direction of the turns 20. The outer region 221 is located on the outer side of each turn 20. The inner region 222 is located on the inner side of each turn 20. The central region 223 is located between the outer region 221 and the inner region 222. The outer region 221, the inner region 222, and the central region 223 are regions formed by dividing, into three equal parts, the length a of the long side 31 of the flat rectangular wire 3 in FIG. 4.

The outer region 221 is configured to be tapered from the inner side toward the outer side of each turn 20. That is, the outer region 221 has a thickness that is gradually reduced from the inner side toward the outer side of the turn 20. The thickness is a length extending along the short side 32 (FIG. 4) of the flat rectangular wire 3. A distal end of the outer region 221 is configured to have a curved shape.

In the outer region 221, a gap 23 is provided between the adjacent turns 20. Each gap 23 is formed so as to be narrowed from the outer side toward the inner side of the turns 20, for example. The gap 23 in the present example is further provided between the central regions 223, in addition to the outer regions 221. The molded resin part 5 described below is present in the gap 23.

A maximum length L1 between the adjacent outer regions 221 may be 10 μm or more and 1000 μm or less. The maximum length L1 is the length between the respective inflection points P of the adjacent outer regions 221, between the curved distal end and the straight side surface of the corresponding turns 20. The maximum length L1 is also the length of the gap 23 along the axial direction of the plurality of turns 20. When the maximum length L1 is 10 μm or more, the gap 23 can be easily secured, and the molded resin part 5 described below is likely to enter the gap 23. When the above-described length of the gap 23 increases, the thickness of the outer region 221 decreases relative thereto. When the maximum length L1 is 1000 μm or less, the thickness of the outer region 221 can be secured relative thereto. The maximum length L1 may also be 20 μm or more and 900 μm or less, and particularly 30 μm or more and 800 μm or less. The maximum length L1 may be 10 μm or more, and less than or equal to the length b (FIG. 4) of the short side 32 of the flat rectangular wire 3. Here, the length b of the short side 32 refers to an average value of the lengths b of the short side 32 of all of the turns 20 on the inner side or the outer side of the straight portions 21 (FIG. 3).

The inner region 222 has a thickness that is equivalent to the length b (FIG. 4) of the short side 32 of the flat rectangular wire 3 before being wound edgewise. The inner region 222 has a thickness that is larger than the thickness of the outer region 221. The thickness of the inner region 222 may be, for example, 1.05 times or more, even 1.1 times or more, and particularly 1.2 times or more of the thickness of the outer region 221.

In the inner region 222, the interval between adjacent turns 20 is smaller than the gap 23 described above. In the inner region 222, the interval between the adjacent turns 20 may be zero. That is, in the inner region 222, the adjacent turns 20 may be in contact with each other. In the inner region 222 of the present example, the adjacent turns 20 are in contact with each other. When a gap is formed in the inner region 222, the molded resin part 5 described below may or may not be present in the gap. For example, in the inner region 222, even when a gap is formed, the molded resin part 5 may not be able to enter the gap, depending on the viscosity or the like of the constituent resin of the molded resin part 5.

Straight Portions of Turn

Figure 6:
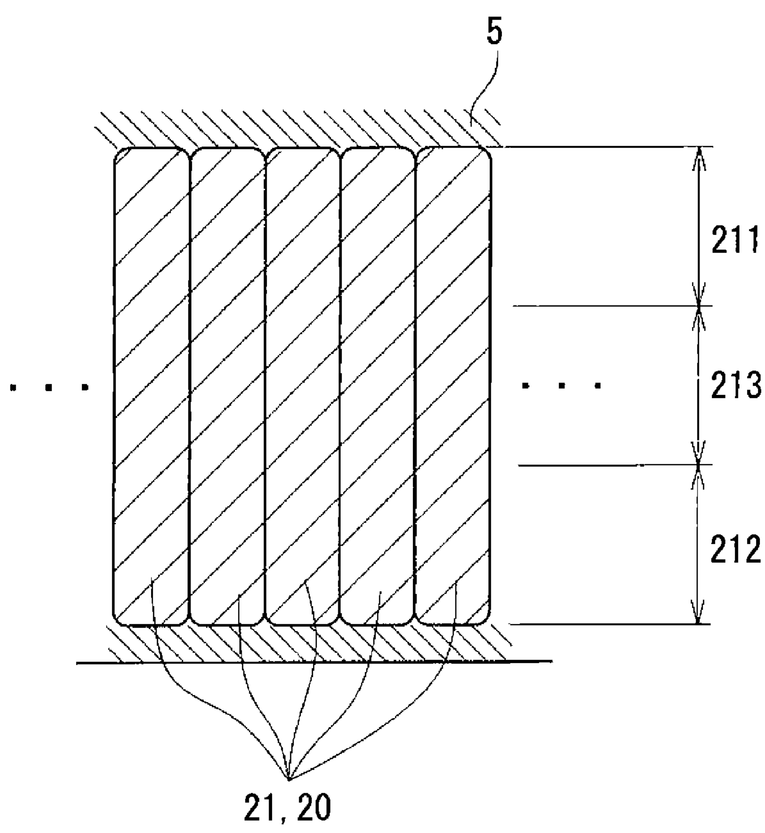
FIG. 6 is a cross-sectional view taken along the line VI-VI in FIG. 2.

As shown in FIG. 6, the straight portions 21 of each turn 20 each include an outer region 211, an inner region 212, and a central region 213 in the above-described longitudinal cross section of the plurality of turns 20 that include the straight portions 21. The outer region 211 is located on the outer side of each turn 20. The inner region 212 is located on the inner side of each turn 20. The central region 213 is located between the outer region 221 and the inner region 222. The outer region 211, the inner region 212, and the central region 213 are regions formed by dividing, into three equal parts, the length a of the long side 31 of the flat rectangular wire 3 shown in FIG. 4.

In each straight portion 21, the thickness of the outer region 211 and the thickness of the inner region 212 are substantially equal. The thickness of the central region 213 is less than or equal to the thickness of the outer region 211 and the thickness of the inner region 212. The thickness of the central region 213 of the present example is equal to the thickness of the outer region 211 and the thickness of the inner region 212.

In the outer region 211 and the inner region 212, the interval between the adjacent turns 20 is smaller than that in the outer region 221 of the corner portion 22. In the outer region 211 and the inner region 212, the interval between the adjacent turns 20 may be zero. That is, in the outer region 211 and the inner region 212, the adjacent turns 20 may be in contact with each other. In the outer region 211 and the inner region 212 of the present example, the adjacent turns 20 are in contact with each other. When a gap is formed in the outer region 211 and the inner region 212, the molded resin part 5 described below may or may not be present in the gap. For example, in the outer region 211 and the inner region 212, even when a gap is formed, the molded resin part 5 may not be able to enter the gap, depending on the viscosity or the like of the constituent resin of the molded resin part 5.

Magnetic Core

The magnetic core 4 includes a portion disposed inside the plurality of turns 20 of the coil 2, and a portion disposed outside the plurality of turns 20. The magnetic core 4 constitutes a closed magnetic circuit through which a magnetic flux that is formed by the coil 2 passes.

The magnetic core 4 of the present example is configured to have an overall θ-shape. As shown in FIG. 1, the θ-shaped magnetic core 4 includes one middle core part 41, two side core parts 42 and 43, and two end core parts 44 and 45. The middle core part 41 includes a portion disposed inside the plurality of turns 20. Each of the two side core parts 42 and 43 is disposed outside the plurality of turns 20 so as to be arranged side by side with the middle core part 41. Each of the two end core parts 44 and 45 is disposed outside the plurality of turns 20 so as to connect the middle core part 41 and the two side core parts 42 and 43 to each other. As a result of the middle core part 41, the two side core parts 42 and 43, and the two end core parts 44 and 45 being connected to each other, a magnetic flux flows through the magnetic core 4 when the coil 2 is excited, thus forming a closed magnetic circuit. The magnetic flux flows from the middle core part 41 to the end core part 44, then flows from the end core part 44 to the two side core parts 42 and 43, then flows from each of the side core parts 42 and 43 to the end core part 45, and then flows from the end core part 45 to the middle core part 41.

The middle core part 41 has a shape that substantially corresponds to the inner circumferential shape of the plurality of turns 20. A gap is present between an inner circumferential surface of the plurality of turns 20 and an outer circumferential surface of the middle core part 41. For example, the molded resin part 5 described below is present in the gap. The middle core part 41 of the present example has a rectangular columnar shape, and has end faces each having a rectangular shape when the middle core part 41 is viewed in the axial direction thereof. Corner portions of the middle core part 41 are rounded so as to extend along the corner portions 22 of the plurality of turns 20.

There is no particular limitation on the shape of the side core parts 42 and 43, as long as the shape extends in the axial direction of the plurality of turns 20 outside the plurality of turns 20. The side core parts 42 and 43 of the present example each have a rectangular parallelepiped shape that extends in the axial direction of the plurality of turns 20. The side core parts 42 and 43 are disposed facing two of the four surfaces constituting the outer circumferential surface of the plurality of turns 20, the two surfaces being located at positions that are opposed to each other across the axis of the plurality of turns 20. That is, the side core parts 42 and 43 are disposed so as to sandwich, from the outside, two of the four surfaces constituting the outer circumferential surface of the plurality of turns 20, the two surfaces being located at positions that are opposed to each other across the axis of the plurality of turns 20. The surfaces of the plurality of turns 20 that are not opposed to the side core parts 42 and 43 are exposed from the magnetic core 4.

There is no particular limitation on the shape of the end core parts 44 and 45, as long as the shape connects end portions of the one middle core part 41 and the two side core parts 42 and 43 to each other. The end core parts 44 and 45 of the present example each have a rectangular parallelepiped shape that is elongated in the direction in which the one middle core part 41 and the two side core parts 42 and 43 are arranged.

The magnetic core 4 may be formed by combining a first core piece and a second core piece. The respective shapes of the first core piece and the second core piece can be selected from various combinations. The magnetic core 4 shown in FIG. 1 is of an E-T type in which an E-shaped first core piece and a T-shaped second core piece are combined. The E-shaped first core piece includes a portion of the middle core part 41, the two side core parts 42 and 43, and the end core part 44. The T-shaped second core piece includes the remaining portion of the middle core part 41 and the end core part 45. Examples of other combinations include an E-U type, an E-I type, and a T-U type.

The magnetic core 4 is formed by a molded body containing a soft magnetic material. Examples of the soft magnetic material include metals such as iron and an iron alloy, and nonmetals such as ferrite. Examples of the iron alloy include an Fe—Si alloy and an Fe—Ni alloy. Examples of the molded body containing the soft magnetic material include a powder compact and a molded body of a composite material.

The powder compact can be obtained by compression molding a powder made of a soft magnetic material, or in other words, a soft magnetic powder. The powder compact has a relatively high proportion of the soft magnetic powder in the core piece, as compared with the composite material. The content of the soft magnetic powder in the powder compact may be, for example, greater than 80 vol %, and even 85 vol % or more, based on the content of the powder compact taken as 100 vol %.

In the molded body of the composite material, the soft magnetic powder is dispersed in the resin. The molded body of the composite material can be obtained by filling a mold with a raw material in which a soft magnetic powder is mixed and dispersed in an unsolidified resin, and solidifying the resin. The magnetic properties, including, for example, the relative permeability and the saturation flux density of the composite material can be easily controlled by adjusting the content of the soft magnetic powder in the resin. The content of the soft magnetic powder in the molded body of the composite material may be, for example, 30 vol % or more and 80 vol % or less, based on the content of the composite material taken as 100 vol %.

The soft magnetic powder is an aggregate of soft magnetic particles. The soft magnetic particles may be coated particles each having an insulating coating on the surface thereof. Examples of the constituent material of the insulating coating include phosphates. Examples of the resin contained in the composite material include a thermosetting resin and a thermoplastic resin. Examples of the thermosetting resin include an epoxy resin, a phenol resin, a silicone resin, and a urethane resin. Examples of the thermoplastic resin include a polyphenylene sulfide (PPS) resin, a polyamide (PA) resin (e.g., nylon 6, nylon 66, nylon 9T, etc.), a liquid crystal polymer (LCP), a polyimide (PI) resin, and a fluororesin. The composite material may contain a filler in addition to the resin. Inclusion of the filler can improve the heat dissipation of the composite material. As the filler, it is possible to use, for example, a powder made of a nonmagnetic material such as ceramics and carbon nanotubes. Examples of the ceramics include an oxide, a nitride, and a carbide of a metal or a nonmetal. Examples of the oxide include alumina, silica, and magnesium oxide. Examples of the nitride include silicon nitride, aluminum nitride, and boron nitride. Examples of the carbide include silicon carbide.

At least a portion of the magnetic core 4 may be formed by the powder compact. In the case of the magnetic core 4 formed by the powder compact, when the molded resin part 5 described below is formed through injection molding during the manufacturing process of the reactor 1, a portion of the magnetic core 4 may be chipped under pressure applied during the injection molding. Therefore, the reactor 1 in which at least a portion of the magnetic core 4 is formed by the powder compact can easily exhibit the effects of the embodiment described below.

Molded Resin Part

As shown in FIG. 1, the molded resin part 5 covers at least a portion of the magnetic core 4. The molded resin part 5 has the function of protecting the magnetic core 4 from the external environment. The molded resin part 5 may also cover the coil 2. When the molded resin part 5 is interposed between the coil 2 and the magnetic core 4, insulation between the coil 2 and the magnetic core 4 can be easily ensured. When the molded resin part 5 is present spanning the coil 2 and the magnetic core 4, the coil 2 and the magnetic core 4 can be easily positioned relative to each other. When the molded resin part 5 is present spanning the first core piece and the second core piece, the first core piece and the second core piece can be fixed to each other.

The molded resin part 5 of the present example covers the outer circumference of the assembly of the coil 2 and the magnetic core 4. The assembly of the present example is protected from the external environment by the molded resin part 5. The assembly of the present example is formed by integrating the coil 2 and the magnetic core 4 into a single piece by the molded resin part 5. At least a portion of the outer circumferential surface of the magnetic core 4, or at least a portion of the outer circumferential surface of the coil 2 may be exposed from the molded resin part 5. In the present example, a portion of the surfaces of the plurality of turns 20 of the coil 2 that are not opposed to the side core parts 42 and 43 is exposed from the molded resin part 5.

As shown in FIG. 5, the molded resin part 5 is present in the gaps 23 provided in the outer regions 221 of the corner portions 22 of the plurality of turns 20. The molded resin part 5 that is present in the gaps 23 is in contact with each of the long sides 31 (FIG. 4) of the flat rectangular wire 3. The molded resin part 5 that is present in the gaps 23 has the function of suppressing displacement between the adjacent turns 20. Displacement between the turns 20 refers to displacement between the turns 20 in the axial direction of the plurality of turns 20.

The molded resin part 5 is present in two gaps 23 provided in at least corner portions 22 of the four corner portions 22 that are diagonally opposite to each other. In other words, the molded resin part 5 is provided in two diagonally opposite gaps 23 of the four gaps 23. The at least two diagonally opposite gaps 23 of the four gaps 23 are gaps that correspond to four corner portions 22 constituting adjacent turns 20. The molded resin part 5 may be present in at least one of the remaining two gaps 23, in addition to the two diagonally opposite gaps 23. The molded resin part 5 may be present in all of the four gaps 23.

A length L2 of a portion of the molded resin part 5 that is present in the gaps 23 may be 25% or more of the length a (see also FIG. 4) of the long side 31 of the flat rectangular wire 3 in a transverse cross section thereof. The length L2 is the maximum length, along the width direction of the flat rectangular wire 3, of the molded resin part 5 is present in the gap 23, from a line connecting distal ends of the outer regions 221 of the adjacent turns 20. The width of the flat rectangular wire 3 is the length of the flat rectangular wire 3 in the direction of the long side 31. When the length L2 is 25% or more of the length a, displacement between the turns 20 can be easily suppressed. The longer the length L2 is, the more easily the displacement between the turns 20 can be suppressed. The length L2 may also be 30% or more, 40% or more, and particularly 50% or more of the length a. The length L2 may be 75% or less, even 70% or less, and particularly 65% or less, in view of the flat rectangular wire 3 being wound edgewise. The length L2 may be 25% or more and 75% or less, even 30% or more and 75% or less, 40% or more and 70% or less, and particularly 50% or more and 65% or less of the length a.

Examples of the resin that forms the molded resin part 5 include the same resins as the above-described resins for the composite material. As in the case of the composite material, the constituent material of the molded resin part 5 may contain any of the above-described fillers.

Converter and Power Conversion Device

The reactor 1 according to the above-described embodiment can be used in applications in which the following conductive conditions are satisfied. Examples of the conductive conditions include a maximum direct current of about 100 A or more and 1000 A or less, an average voltage of about 100 V or more and 1000 V or less, and a working frequency of about 5 kHz or more and 100 kHz or less. Typically, the reactor 1 according to the embodiment can be used as a constituent component of a converter placed in a vehicle such as an electric automobile and a hybrid automobile, and a constituent component of a power conversion device including such a converter.

Figure 7:
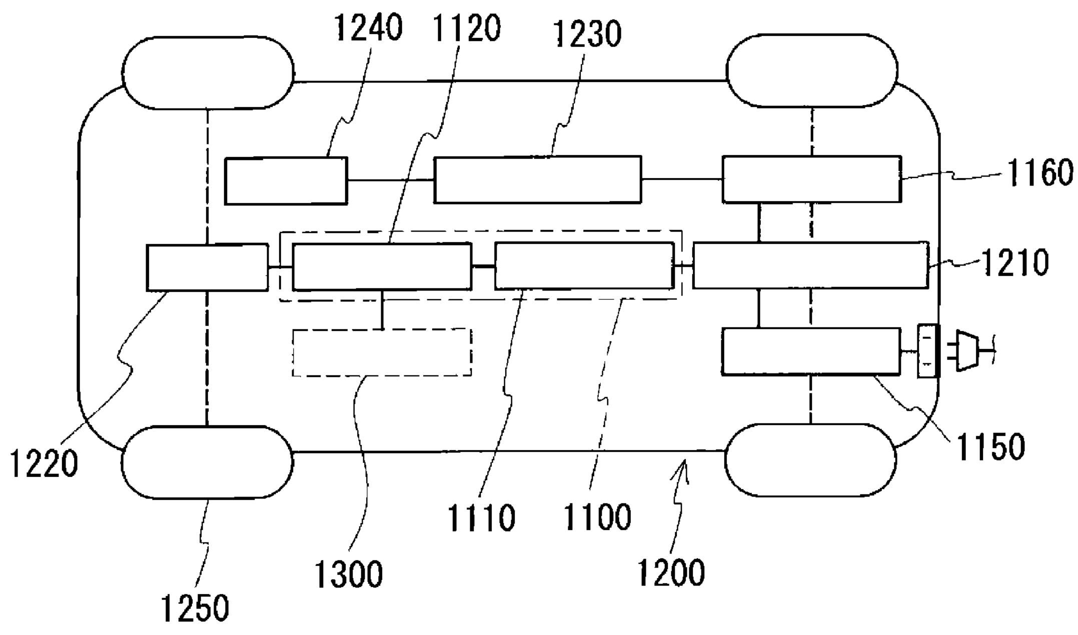
FIG. 7 is a configuration diagram schematically showing a power supply system of a hybrid automobile.

As shown in FIG. 7, a vehicle 1200 such as a hybrid automobile or an electric automobile includes a main battery 1210, a power conversion device 1100 that is connected to the main battery 1210, and a motor 1220 that is driven by the power supplied from the main battery 1210 and is used for traveling. The motor 1220, which is typically a three-phase alternating-current motor, drives wheels 1250 during travel, and functions as a generator during regeneration. In the case of a hybrid automobile, the vehicle 1200 includes an engine 1300 in addition to the motor 1220. Although FIG. 7 shows an inlet as a portion for charging the vehicle 1200, it is possible to adopt a configuration in which a plug is provided.

The power conversion device 1100 includes a converter 1110 that is connected to the main battery 1210, and an inverter 1120 that is connected to the converter 1110 and that converts direct current to alternating current and vice versa. While the vehicle 1200 is traveling, the converter 1110 shown in the present example steps up the input voltage of the main battery 1210, from about 200 V to 300 V to about 400 V to 700 V, thus feeding power to the inverter 1120. During regeneration, the converter 1110 steps down the input voltage that is output from the motor 1220 through the inverter 1120, to a direct-current voltage suitable for the main battery 1210, thus charging the main battery 1210. The input voltage is a direct-current voltage. While the vehicle 1200 is traveling, the inverter 1120 converts the direct current whose voltage has been stepped up by the converter 1110, to a predetermined alternating current, thus feeding power to the motor 1220. During regeneration, the inverter 1120 converts the alternating-current output from the motor 1220 to a direct current, and outputs the direct current to the converter 1110.

Figure 8:
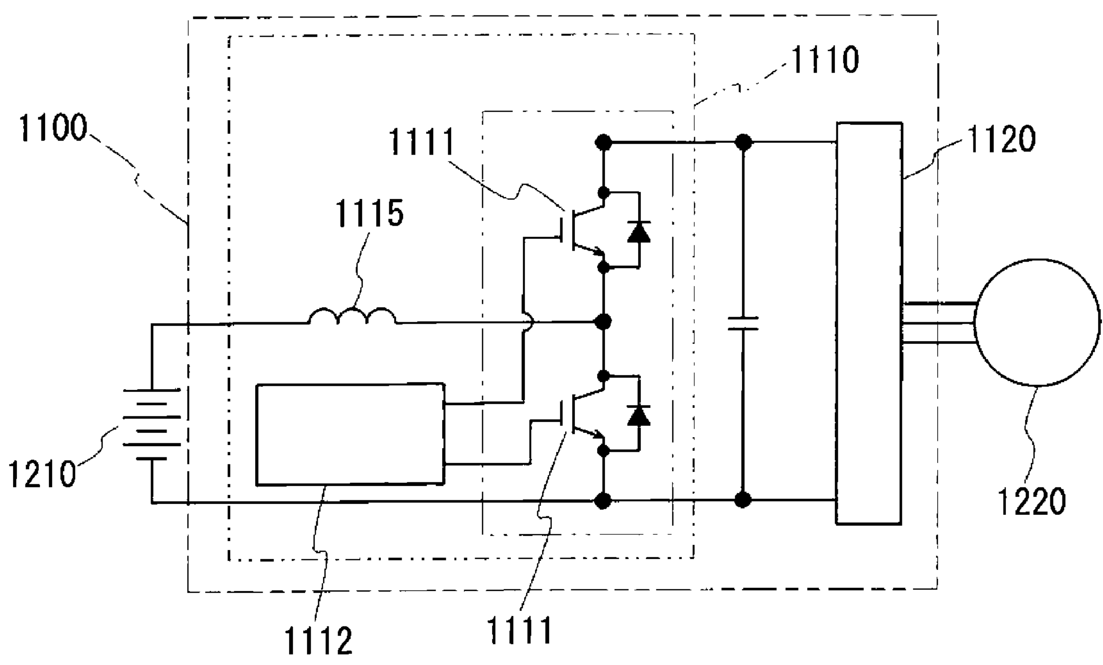
FIG. 8 is a circuit diagram showing an outline of an example of a power conversion device including a converter.

As shown in FIG. 8, the converter 1110 includes a plurality of switching elements 1111, a drive circuit 1112 that controls the operation of the switching elements 1111, and a reactor 1115, and converts an input voltage by repeating ON/OFF operations. Here, converting an input voltage means that an input voltage is stepped up/stepped down. Power devices such as field-effect transistors or insulated gate bipolar transistors are used as the switching elements 1111. The reactor 1115 has the function of smoothing any change in current when a current is about to be stepped up or stepped down in response to a switching operation, using the properties of the coil preventing changes in a current that is attempting to flow through the circuit. The reactor 1 of the above-described embodiment is provided as the reactor 1115.

The vehicle 1200 includes, in addition to the converter 1110, a power feeding device converter 1150 that is connected to the main battery 1210, and an auxiliary equipment power supply converter 1160 that is connected to the main battery 1210 and a sub-battery 1230 serving as the power source for auxiliary equipment 1240, and that converts a high voltage of the main battery 1210 to a low voltage. The converter 1110 typically performs DC-DC conversion, whereas the power feeding device converter 1150 and the auxiliary equipment power supply converter 1160 perform AC-DC conversion. There is also a power feeding device converter 1150 that performs DC-DC conversion. A reactor having the same configuration as the reactor 1 of the above-described embodiment, with the size, shape, and the like of the reactor being changed as appropriate, can be used as a reactor for the power feeding device converter 1150 and the auxiliary equipment power supply converter 1160. Furthermore, the reactor 1 of the above-described embodiment can also be used for a converter that converts input power and only increases or decreases the voltage.

Effects of Embodiment

The reactor 1 according to the embodiment can suppress displacement between the turns 20, since the molded resin part 5 is present in the gaps 23 in at least diagonally opposite corner portions 22 of the four corner portions 22 constituting the turns 20. For example, the reactor 1 according to the embodiment can also suppress displacement between the turns 20, even under vibration due to an external force or excitation of the coil 2 when the reactor 1 is in use. Since displacement between the turns 20 can be suppressed, any foreign object present between the turns 20 will not slide between the turns 20, thus making it possible to prevent the foreign object from damaging the insulating coating 39 of the flat rectangular wire 3. Therefore, the reactor 1 according to the embodiment can prevent a short circuit from occurring between the turns 20 even if a foreign object is present between the turns 20.

Since the adjacent turns 20 are in contact with each other on the inner side and the outer side of the straight portions 21 of the turns 20, and the inner side of the corner portions 22, the reactor 1 according to embodiment is compact. The reason that the reactor 1 is compact is that the coil 2 formed by the plurality of turns 20 has a short axial length since the adjacent turns 20 are in contact with each other. The reason that the adjacent turns 20 are in contact with each other is that the coil 2 is wound edgewise such that the adjacent turns 20 are in contact with each other when the coil 2 is produced.

By satisfying the following conditions, the reactor 1 according to the embodiment has a coil 2 with a short axial length, and the gaps 23 are likely to be formed on the outer side of the corner portions 22 of the turns 20. The first condition is that the aspect ratio of the flat rectangular wire 3 in a transverse cross section thereof is 2 or more. The second condition is that the bending radius R of each corner portion 22 is 10 mm or less. By satisfying the above-described conditions, for example, the maximum length L1 of the adjacent outer regions 221 is likely to be 10 μm or more and 1000 μm or less, and thus the molded resin part 5 is likely to enter the gaps 23. The length L2 of the portion of the molded resin part 5 that is present in the gaps 23 is likely to be 25% or more of the length a of the long side 31 of the flat rectangular wire 3 in a transverse cross section thereof. Since the molded resin part 5 is favorably present in the gaps 23, displacement between the turns 20 can be favorably suppressed.

The power conversion device 1100 according to the embodiment and the converter 1110 according to the embodiment include the reactor 1 according to the embodiment, and thus can prevent a short circuit from occurring between the turns 20 of the coil 2 even when a foreign object is present between the turns 20, and is highly reliable.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A reactor comprising:

an edgewise coil formed by a flat rectangular wire;

a magnetic core including a middle core portion and two side core portions at opposite ends of the middle core portion; and a molded resin portion that covers at least a portion of the magnetic core, wherein the edgewise coil includes a plurality of turns configured to form a rectangular shape in which the middle core portion is disposed, each of the plurality of turns includes four straight portions, and four curved corner portions that connect the adjacent straight portions to each other, each of the four corner portions includes an outer region in which a gap is provided between the adjacent turns when viewed in a direction orthogonal to an axial direction of the turns of the edgewise coil, the molded resin portion is present in at least two of the gaps that are diagonally opposite to each other, in a cross-sectional view, a shortest distance between an outer circumferential surface of the middle core portion and the molded resin portion in the gaps of the corner portions is less than a shortest distance between the outer circumferential surface of the middle core portion and the molded resin portion at the straight portions such that displacement between the turns of the edgewise coil is suppressed, and wherein each of the four corner portions has a bending radius of 10 mm or less.

2. The reactor according to claim 1, wherein each of the four corner portions further includes an inner region in which an interval between the adjacent turns is smaller than an interval between the gaps.

3. The reactor according to claim 1, wherein an aspect ratio a/b that is a ratio between a length a of a long side and a length b of a short side of the flat rectangular wire in a cross section thereof is 2 or more.

4. The reactor according to claim 1, wherein a maximum length between the adjacent outer regions is 10 μm or more and 1000 μm or less.

5. The reactor according to claim 1, wherein a length of a portion of the molded resin portion that is present in the gaps is 25% or more of a length of a long side of the flat rectangular wire in a cross section thereof.

6. A converter comprising the reactor according to claim 1.

7. A power conversion device comprising the converter according to claim 6.

8. The reactor according to claim 1, wherein each of the four corner portions further includes an inner region, an interval between the adjacent turns in the inner region is zero, and a maximum length between the adjacent outer regions is 10 μm or more and 1000 μm or less such that a length of a portion of the molded resin portion that is present in the gaps is 30% or more and 75% or less of a length of a long side of the flat rectangular wire in a cross section thereof.

9. The reactor according to claim 1, wherein along a width direction of the edgewise coil, a maximum length of a portion of the molded resin portion that is present between the adjacent outer regions of the corner portions is greater than a maximum length of a portion of the molded resin portion that is present between the adjacent outer regions of the straight portions.

10. A reactor comprising:

an edgewise coil formed by a flat rectangular wire;

a magnetic core; and a molded resin portion that covers at least a portion of the magnetic core, wherein the edgewise coil includes a plurality of turns configured to form a rectangular shape, each of the plurality of turns includes four straight portions, and four curved corner portions that connect the adjacent straight portions to each other, each of the four corner portions includes an outer region in which a gap is provided between the adjacent turns, a maximum length between the adjacent outer regions is 10 μm or more and 1000 μm or less such that a length of a portion of the molded resin portion that is present in the gaps is 30% or more and 75% or less of a length of a long side of the flat rectangular wire in a cross section thereof such that the molded resin portion is present in at least two of the gaps that are diagonally opposite to each other and displacement between the turns of the edgewise coil is suppressed, and wherein each of the four corner portions has a bending radius of 10 mm or less.

* * * * *